(12) United States Patent
Zheng

(10) Patent No.: US 11,126,046 B2
(45) Date of Patent: Sep. 21, 2021

(54) DISPLAY PANEL, MANUFACTURING METHOD THEREOF, AND DISPLAY DEVICE

(71) Applicant: WUHAN CHINA STAR OPTOELECTRONICS TECHNOLOGY CO., LTD., Hubei (CN)

(72) Inventor: Yingbo Zheng, Hubei (CN)

(73) Assignee: WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 30 days.

(21) Appl. No.: 16/630,931

(22) PCT Filed: Nov. 7, 2019

(86) PCT No.: PCT/CN2019/116389
§ 371 (c)(1),
(2) Date: Jan. 14, 2020

(87) PCT Pub. No.: WO2021/031378
PCT Pub. Date: Feb. 25, 2021

(65) Prior Publication Data
US 2021/0055594 A1    Feb. 25, 2021

(30) Foreign Application Priority Data
Aug. 22, 2019   (CN) .......................... 201910777664.1

(51) Int. Cl.
*G02F 1/1345*   (2006.01)
*G02F 1/1335*   (2006.01)

(52) U.S. Cl.
CPC ...... *G02F 1/13452* (2013.01); *G02F 1/13458* (2013.01); *G02F 1/133514* (2013.01); *G02F 1/133528* (2013.01); *G02F 2201/50* (2013.01)

(58) Field of Classification Search
CPC ........... G02F 1/13452; G02F 1/133514; G02F 1/133528; G02F 1/13458; G02F 2201/50
USPC ......................................................... 349/96
See application file for complete search history.

(56) References Cited

U.S. PATENT DOCUMENTS

| 2018/0114943 A1 | 4/2018 | Lee et al. | |
| 2019/0033645 A1* | 1/2019 | Zhang | G02F 1/133514 |
| 2019/0204669 A1* | 7/2019 | Lee | H01L 23/498 |

(Continued)

FOREIGN PATENT DOCUMENTS

| CN | 107121854 A | 9/2017 |
| CN | 107247355 A | 10/2017 |
| CN | 108153070 A | 6/2018 |

(Continued)

*Primary Examiner* — Nathanael R Briggs
*Assistant Examiner* — William D Peterson

(57) ABSTRACT

The present disclosure provides a display panel, a manufacturing method thereof, and a display device. By disposing a conductive film at terminals of an array substrate and a color filter substrate having sides flush with each other, forming a chamfer on an edge of a bonding area corresponding to the color filter substrate or the array substrate, and making a chip on film bonded to the conductive film and bent along the chamfer for bonding, frame widths of display panels and risks of broken lines in a frame area of display panels are reduced.

16 Claims, 3 Drawing Sheets

(56) References Cited

U.S. PATENT DOCUMENTS

2020/0142237 A1   5/2020  Zheng
2020/0214137 A1*  7/2020  Huang ................... H05K 1/028

FOREIGN PATENT DOCUMENTS

| CN | 109001943 A | 12/2018 |
| CN | 109212851 A | 1/2019 |
| CN | 109215521 A | 1/2019 |
| CN | 109521610 A | 3/2019 |
| CN | 109541834 A | 3/2019 |
| CN | 109671352 A | 4/2019 |

* cited by examiner

DISPLAY PANEL, MANUFACTURING METHOD THEREOF, AND DISPLAY DEVICE

FIELD OF INVENTION

The present disclosure relates to the field of display technologies, and more particularly to a display panel, a manufacturing method thereof, and a display device having the display panel.

BACKGROUND OF INVENTION

Advances in display technologies have prompted the diversity of display devices. Full screen display devices and flexible display devices are the mainstream of developing display devices. To increase a screen ratio of display panels, chip on glass (COG) technology or chip on film (COF) technology are generally used to bond a driver chip to an array substrate or a flexible circuit board to reduce a lower frame area of a display panel and increase a screen ratio thereof.

However, the COG technology and the COF technology have their own disadvantages. For example, the COG technology needs to reserve space on an array substrate for bonding a driver chip and a flexible circuit board, so there is a certain limit to a size of a lower frame. The COF technology is to bond a driver chip to a flexible circuit board, which reduces a partial size of a lower frame, but it still reserves a predetermined position to bond a flexible circuit board that can only reduce a size of a lower frame to a certain degree, which cannot make a display device become rimless.

To the limitation of the above two technical solutions, some manufacturers have begun to try to bond a COF to a side of a substrate to further reduce a width of a lower frame. The method can effectively reduce the width of the lower frame, but there are also obvious shortcomings. Because a flexible circuit board is bonded to a side surface of the substrate, to prevent a phenomenon of broken lines, the flexible circuit board must have a sufficient length to ensure an effective bonding area, therefore making a thickness of a display panel become greater.

Technical problem: the present disclosure provides a display panel, a manufacturing method thereof, and a display device by disposing a conductive film at a terminal of an array substrate or a color filter substrate away from a display area, making a chip on film bonded to the conductive film, and forming a chamfer on an edge of an bonding area corresponding to the color filter substrate or the array substrate to solve technical problems of increased thicknesses or limited frame in current display panels when designing narrow frames.

SUMMARY OF INVENTION

To solve the above problems, the present disclosure provides technical solutions as follows:

The present disclosure provides a display panel. The display panel comprises an array substrate, a color filter substrate disposed opposite to the array substrate, wherein terminals of the array substrate and the color filter substrate are flush with each other to form a side bonding area. The side bonding area is provided with a bonding terminal and a conductive film attached to the side bonding area, and the conductive film is electrically connected to the bonding terminal. An edge of the side bonding area corresponding to the color filter substrate or the array substrate forms a chamfer, and the conductive film is attached to terminal surfaces of the color filter substrate and the array substrate and extends to one side where the chamfer is disposed.

A chip on film is bonded to the conductive film, bent along the chamfer, and extends to a side disposing the chamfer for bonding to the conductive film. The chip on film is electrically connected to the array substrate by the conductive film. The chamfer provides the chip on film a smooth transition when bonding, reducing damage to the chip on film and preventing signal lines to be broken.

A surface of the chamfer can be provided with a protective layer with conductivity. The protective layer can be obtained by extending the conductive film, that is, when the conductive film attaches to terminal surfaces of the color filter substrate and the array substrate, the conductive film extends to a side disposing the chamfer to obtain the protective layer. The protective layer can be solely prepared, that is, the protective layer is not obtained by extending the conductive film. A side of the protective layer adjacent to the conductive film is connected to the conductive film. The protective layer can be used to increase an electrical connection area of the chip on film and the array substrate, so that the connection is more reliable.

Because the chip on film is bonded to the conductive film along the chamfer, a bending direction for bonding is different in accordance with a position of the chamfer.

When the chamfer is disposed on an edge of the side bonding area corresponding to the array substrate, the chip on film is bent to the bottom of the array substrate along the chamfer. Wherein the bottom of the array substrate is referred to a side of the array substrate away from a surface disposing signal lines of the array substrate.

When the chamfer is disposed on an edge of the side bonding area corresponding to the color filter substrate, the chip on film is bent to the top of the color filter substrate along the chamfer. Wherein the top of the color filter substrate is referred to a side of the color filter substrate away from surfaces disposing signal lines of the array substrate and patterns of the color filter substrate.

Because sides of the array substrate and the color filter substrate are flush with each other to form the side bonding area, and the conductive film is disposed in the side bonding area, therefore ensuring the chip on film effectively bonded to the conductive film. In addition, under the condition of the bonding reliability meeting the requirements, the conductive film can be disposed only on a terminal of the array substrate or the color filter substrate.

The present disclosure provides a manufacturing method of a display panel. The manufacturing method comprises following steps:

S1: providing an array substrate and a color filter substrate, wherein cutting lines of the array substrate and the color filter substrate are flush with each other to form a side bonding area;

S2: manufacturing a chamfer on an edge of the side bonding area corresponding to the color filter substrate or the array substrate by polishing and chamfering, wherein a surface roughness of the chamfer is less than 1 μm;

S3: manufacturing a conductive film in the side bonding area and making the conductive film extend to one side where the chamfer is disposed;

S4: bonding a chip on film on the conductive film and making the chip on film bent along the chamfer for bonding.

Wherein the manufacturing method of the conductive film includes, but is not limited to, various processes, such as magnetron sputtering, evaporation process, 3D printing, inkjet printing, metal electrodeposition, metal photodeposition. If the conductive film is exceeded a needed area during the manufacturing process, the excessive conductive film can be removed by laser that prevents problems of short circuit.

Because in normal designs, a length of the array substrate is greater than a length of the color filter substrate, in order to make a side of the array substrate flush with a side of the color filter substrate, cutting lines of the array substrate and the color filter substrate need to be combined. The cutting line is disposed outside a fanout area of a non-display area of the display panel away from wirings of the lower frame of the display panel. A gap about 3 μm is between the array substrate and the color filter substrate, and frame glue is used to fill with the gap to ensure the display panel having sufficient package performance.

An edge of the bonding area corresponding to the array substrate or the color filter substrate is manufactured to the chamfer by polishing and chamfering. A side surface to a back or front surface of the array substrate or the color filter substrate is made smooth and round or to an arc of radius R by removing cutting cracks and cutting defect areas.

That is, if the array substrate is provided with the chamfer, the chip on film is bent along the chamfer and bonded to one side of the array substrate away from the color filter substrate. If the color filter substrate is provided with the chamfer, the chip on film is bent along the chamfer and bonded to one side of the color filter substrate away from the array substrate. In addition, both the array substrate and the color filter substrate can be provided with the chamfer, side edges of the array substrate and the color filter substrate are smoothly connected to the bottom of the array substrate and the top of the color filter substrate.

In addition to disposing the conductive film and the chamfer in a liquid crystal display panel, the conductive film and the chamfer can also be disposed in a flexible display panel. In this situation, because there is no color filter substrate in a flexible display panel, a conductive film is disposed only at a terminal of the array substrate away from a display area. The chamfer is correspondingly disposed on an edge of the array substrate bonding area and is smoothly connected to the conductive film area and one side of the array substrate away from the signal lines on the array substrate. The chip on film is bonded to the conductive film and is electrically connected to the array substrate by the conductive film. The chip on film is bent along the chamfer and bonded to the bottom of the array substrate. Due to the chamfer, risk of disconnection is prevented.

The present disclosure provides a display device which comprises the above display panel. The chip on film comprises a driver chip and a flexible circuit board. The driver chip is bonded to the flexible circuit board by chip on film packaging, and the driver chip is bent along the chamfer and bonded to one side away from the signal lines on the array substrate with the flexible circuit board.

Since the chamfer can be disposed on a side of the array substrate or the color filter substrate, a bonding position of the driver chip is different according to a bonding position of the chamfer. When the chamfer is disposed on one side of the array substrate away from the color filter substrate, the driver chip is bonded to the side of the array substrate away from the color filter substrate. When the chamfer is disposed on one side of the color filter substrate away from the array substrate, the driver chip is bonded to the side of the color filter substrate away from the array substrate.

Since the chip on film packaging is used, the driver chip is disposed on the flexible circuit board and is electrically connected to the array substrate through the conductive film and the chamfer that prevents risk of disconnection. An effective area for the flexible circuit board and the driver chip bonding to the array substrate can be set according to demand, wherein impedance between the display panel and the driver chip should be less than 10Ω.

Surfaces of the flexible circuit board and the driver chip are provided with a protective layer after bonded to the array substrate or the color filter substrate to prevent problems of pulling, bending, and water oxygen erosion.

Beneficial effect: compared to current display panels, manufacturing methods thereof, and display devices, the present disclosure disposes a conductive film at terminals of an array substrate and a color filter substrate away from a display area, and forms a chamfer on an edge of the bonding area corresponding to the color filter substrate or the array substrate to reduce frame widths of display panels and risk of broken lines in the frame area of display panels. The structure is simple and easy to be achieved.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which figures those skilled in the art can derive further figures without making any inventive efforts.

DETAILED DESCRIPTION OF PREFERRED EMBODIMENTS

Figure 1A:
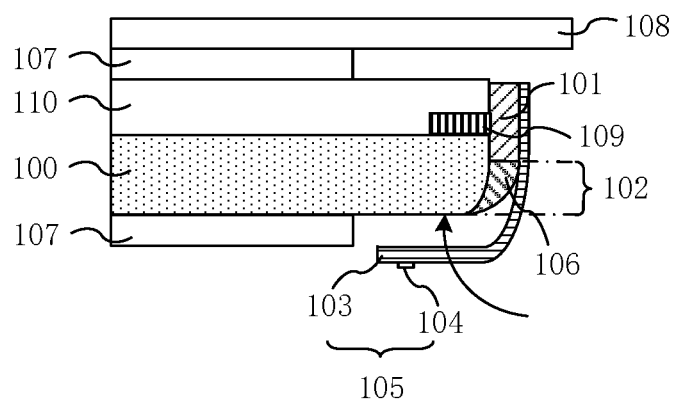
FIG. 1A is a schematic structural diagram of a first display panel according to an embodiment of the present disclosure.

The specific embodiments described with reference to the attached drawings are all exemplary and are intended to illustrate and interpret the present disclosure. In the description of the present disclosure, it should be understood that terms such as "upper", "lower", "front", "rear", "left", "right", "inside", "outside", "side", as well as derivative thereof should be construed to refer to the orientation as described or as shown in the drawings under discussion. These relative terms are for convenience of description, do not require that the present disclosure be constructed or operated in a particular orientation, and shall not be construed as causing limitations to the present disclosure. The identical or similar reference numerals constantly denote the identical or similar elements or elements having the identical or similar functions in the drawings.

Current display panels, manufacturing methods thereof, and display devices have a problem of a bigger frame width caused by reserving a placing position for a flexible circuit board and a driver chip on an array substrate is needed. An embodiment of the present disclosure can solve the defect.

As shown in FIG. 1A, FIG. 1A is a schematic structural diagram of a first display panel according to an embodiment of the present disclosure. The display panel comprises an array substrate 100, a color filter substrate 110 disposed opposite to the array substrate 100, an upper polarizer 107 and a lower polarizer 107 covering on atop of the color filter substrate 110 and a bottom of the array substrate 100, and a package cover 108. In addition, the display panel further comprises liquid crystal molecules between the color filter substrate 110 and the array substrate 100, and a back film disposed on a bottom of the panel which are not shown.

The schematic structural diagram as shown in FIG. 1A is mainly a non-display area of the display panel, and a display area of the display panel is not shown in the figure. It can be known from FIG. 1A, sides of the array substrate 100 and the color filter substrate 110 are flush with each other to form a side bonding area, and the side bonding area is disposed on one side of the array substrate 100 and the color filter substrate 110 away from the display area of the display panel. The side bonding area provides a bonding terminal (not shown in the figure) and a conductive film 101 attaching to the side bonding area. A chamfer 102 is formed on an edge of the bonding area corresponding to the array substrate 100, a chip on film 105 includes a flexible circuit board 103 and a driver chip 104, and the chip on film 105 is electrically connected to the array substrate 100 by the conductive film 101.

The chip on film 105 is bent along the chamfer 102 and bonded to one side of the array substrate 100 away from the color filter substrate 110, that is, the chip on film 105 is bent and bonded to a bottom of the array substrate 100, which is pointed by the arrow. Since the chamfer 102 is a smooth transition, a phenomenon of signal lines being cut can be prevented.

The chamfer 102 is coated with a protective layer 106 after being processed by a grinding process. The protective layer 106 can prevent signal lines from oxidation and make the signal lines having a predetermined conductivity at the same time that ensures the reliability of the electrical connection between the chip on film 105 and the array substrate 100. The protective layer 106 can be obtained by directly extending the conductive film 101 or can be solely prepared.

The conductive film 101 is disposed in the side bonding area, so the conductive film 101 and the chip on film 105 have a sufficient effective contact area that ensures the reliability of the electrical connection between the flexible circuit board 103 and the array substrate 100. The chip on film 105 is bonded to the conductive film 101 by an anisotropic conductive adhesive (not shown in the figure), and the anisotropic conductive adhesive comprises, but is not limited to, an anisotropic conductive film (ACF), an anisotropic conductive adhesive (ACA), or an anisotropic conductive paste (ACP).

Figure 1B:
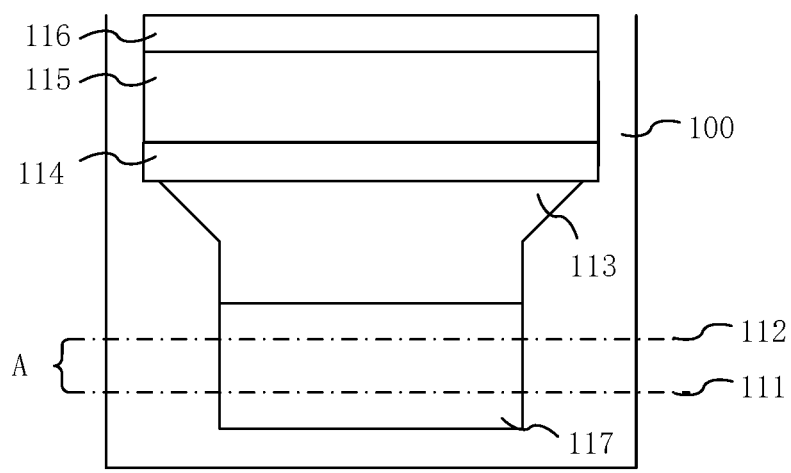
FIG. 1B is a top view of a non-display area of a display panel according to an embodiment of the present disclosure.

As shown in FIG. 1B, FIG. 1B is a top view of a non-display area of a display panel according to an embodiment of the present disclosure, which comprises a fanout area 113, a demultiplex circuit area (Demux area) 115, a Dummy area 116, and an ESD area 114. As shown in FIG. 1B, since sides of the array substrate 100 and the color filter substrate 110 are flush with each other, cutting lines 111 of the array substrate 100 and the color filter substrate 110 need to be combined, which is different from normal designs. The cutting line 111 is disposed outside the fanout area 113 of the display panel away from wirings of the lower frame of the display panel. At this time, a gap of about 3 μm is between the array substrate 100 and the color filter substrate 110, and to ensure efficient package performance, frame glue 109 is used to fill with the gap as shown in FIG. 1A.

A disposing range of the chamfer 102 is defined by the cutting line 111 and a polishing line 112 as shown in FIG. 1B, and the defined range is A. The polishing line 112 is away from wirings of the lower frame of the display panel. The chamfer 102 is processed into a smooth transition shape within the defined range to achieve a smooth transition between an area of the conductive film 101 and a bottom of the array substrate 100 that prevents possibilities of broken lines.

The defined range A of the chamfer 102 is determined by a set length of the conductive film 101 on a side of the array substrate 100 and a thickness of the array substrate 100. If the thickness of the array substrate 100 is constant, the defined range A is less, and when the length of the conductive film 101 extending to the bottom of the array substrate 100 is longer, a curve forming the chamfer 102 is shorter and a bending degree of the curve is greater.

Similarly, if the thickness of the array substrate 100 is constant, the defined range A is greater, and the length of the conductive film 101 extending to the bottom of the array substrate 100 is shorter, the curve forming the chamfer 102 is longer and the bending degree of the curve is less, thereby the smaller the impact on the signal lines. In the embodiment, if the curve is arc-shaped, a radius of the arc ranges from 0.06 mm to 0.1 mm. If the curve is a gentle gradient curve, the radii of the curve are determined according to requirements. Those skilled in the art can also reasonably set the required curve radius or curve shapes according to requirements to adapt to different needs.

Referring to FIG. 1B, after disposing the conductive film 101 and the chamfer 102 on the array substrate 100, the chip on film 105 is bent along the chamfer 102, bent to a portion 117 of the bottom, and overlaps the Demux area 115 of the display panel, thereby reducing frame widths and not having a greater influence on the thickness of the display panel.

Figure 2:
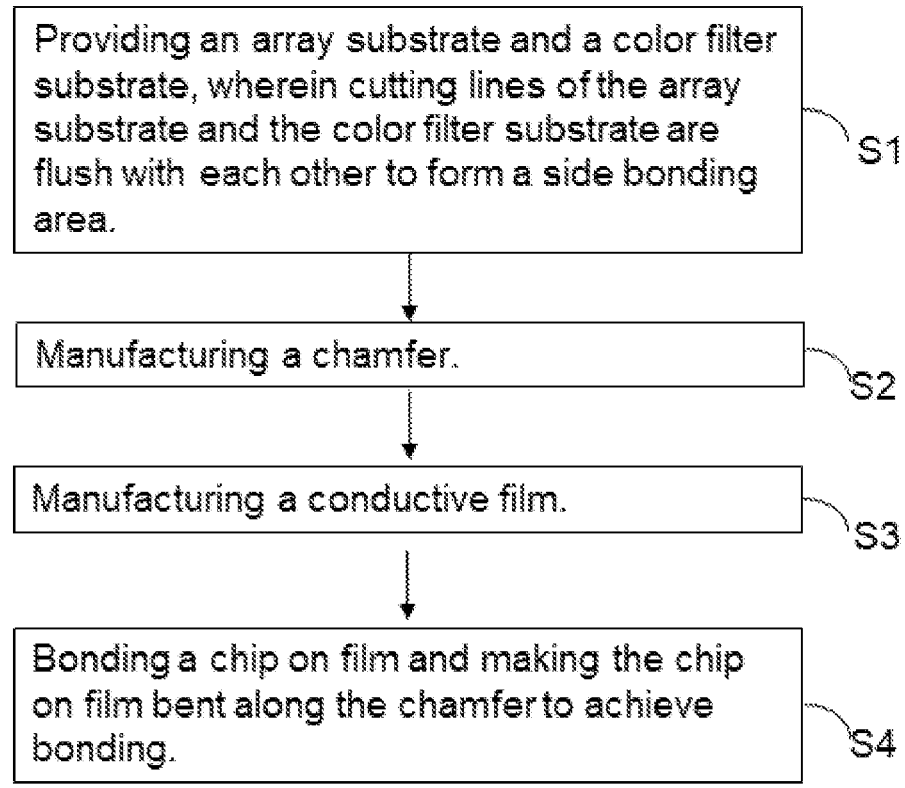
FIG. 2 is a manufacturing flowchart of a display panel according to an embodiment of the present disclosure.

As shown in FIG. 2, FIG. 2 is a manufacturing flowchart of a display panel according to an embodiment of the present disclosure, which comprises following steps:

S1: providing an array substrate 100 and a color filter substrate 110, wherein cutting lines of the array substrate 100 and the color filter substrate 110 are flush with each other to form a side bonding area;

S2: manufacturing a chamfer 102 on an edge of the bonding area corresponding to the color filter substrate 110 or the array substrate 100 by polishing and chamfering, wherein a surface roughness of the chamfer 102 is less than 1 μm;

S3: manufacturing a conductive film 101 in the side bonding area;

S4: bonding a chip on film 105 to the conductive film 101 and making the chip on film 105 bent along the chamfer 102 for bonding.

Wherein the manufacturing method of the conductive film 101 includes, but is not limited to, various processes, such as magnetron sputtering, evaporation process, 3D printing, inkjet printing, metal electrodeposition, and metal photodeposition. If the conductive film 101 exceeds a needed area during the manufacturing process, the excessive conductive film can be removed by laser that prevents problems of short circuit.

Figure 3:
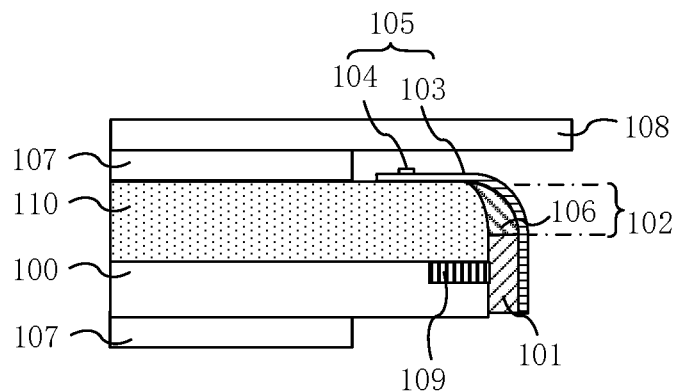
FIG. 3 is a schematic structural diagram of a second display panel according to an embodiment of the present disclosure.

As shown in FIG. 3, FIG. 3 is a schematic structural diagram of a second display panel according to an embodiment of the present disclosure. The reference numerals in the figure are the same as the reference numerals in FIG. 1A, and will not be described here. It can be known from FIG. 3, cutting lines of the array substrate 100 and the color filter substrate 110 are flush with each other to form a side bonding area. The conductive film 101 is disposed in the side bonding area, the chamfer 102 is disposed on a side of the color filter substrate 110, and the chip on film 105 is bent along the chamfer 102 and bonded to a side of the color filter substrate 110 away from the array substrate 100.

The conductive film 101 is disposed in the side bonding area that ensures the reliability of the connection between the chip on film 105 and the conductive film 101. In addition, under the condition of the bonding reliability of the chip on film 105 and the conductive film 101 meeting the requirements, the conductive film can be disposed only on a terminal of the array substrate 100 or a terminal of the color filter substrate, which is not further limited thereto and a person skilled in the art can dispose according to actual needs.

In addition to the structures shown in the above embodiments, the chamfer 102 can be disposed on the array substrate 100 and the color filter substrate 110. A shape of an area where the conductive film 101 is located is not limited to a straight line, and may form a smooth chamfer shape together with the chamfer area. A person skilled in the art can set a structure that satisfies requirements according to actual needs.

A structure of a liquid crystal display panel is described in the embodiment. Besides, the conductive film 101 and the chamfer 102 can also be disposed in an array substrate of a flexible display panel. Since the design of the conductive film 101 and the chamfer 102 in a flexible display panel is the same as in a liquid crystal display panel, it is not described herein and a person skilled in the art can dispose it according to the given method of disposing a conductive film and a chamfer on the array substrate of the liquid crystal display panel.

Figure 4:
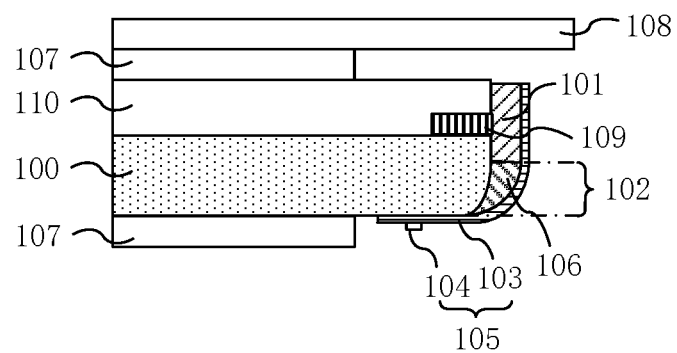
FIG. 4 is a schematic structural diagram of a display device according to an embodiment of the present disclosure.

As shown in FIG. 4, FIG. 4 is a schematic structural diagram of a display device according to an embodiment of the present disclosure. The reference numerals in the figure continue to follow that in FIG. 1. The display device as shown comprises the above display panel, the chip on film 105 comprises a driver chip 104 and a flexible circuit board 103, the driver chip 104 is bonded to the flexible circuit board 103 by chip on film packaging technology, and the driver chip 104 is bent along the chamfer 102 and bonded to a bottom of the array substrate 100 with the flexible circuit board 103. The driver chip 104 is electrically connected to the substrate 100 by the flexible circuit board 103 and the conductive film 101. The chamfer 102 is a smooth transition, so a phenomenon of signal lines being cut can be prevented.

An effective area for the flexible circuit board 103 and the driver chip 104 bonding to the array substrate 100 can be set according to demands, wherein impedance between the display panel and the driver chip 104 should be less than 100.

In general, predetermined space is reserved in a middle frame in some display panels to dispose the driver chip 104, so although a thickness of the driver chip 104 is slightly greater than a thickness of the polarizer 107, the driver chip 104 can also be disposed in reserved space of a middle frame (not shown in the figure) to prevent possible damage to the driver chip. If the middle frame has no reserved space, a thickened polarizer can be used, wherein the thickness of the polarizer 107 is greater than the thickness of the driver chip 104, thereby achieving protection for the driver chip.

Surfaces of the flexible circuit board 103 and the driver chip 104 are provided with protective glue (not shown in the figure) after bonded to the array substrate 100 to prevent problems of pulling, bending, or water oxygen erosion causing damage to the flexible circuit board 103 and the driver chip 104. In addition to the structure as shown in FIG. 4, the driver chip 104 can be also bonded to a top of the color filter substrate 110 along the chamfer 102 with the flexible circuit board 103, which is not described herein.

Compared with current COG technology, COF technology, and COF side bonding technology, parameter comparison data of a liquid crystal display panel obtained from the present disclosure is shown in the following table:

|  | Types of bonding area | | | |
| --- | --- | --- | --- | --- |
|  | COG (front surface) | COF (front surface) | COF side bonding | The present disclosure |
| Thickness of panel | 0.25 mm | 0.25 mm | 1.0 mm | 0.25 mm |
| Lower frame width | 2.4 mm | 1.6 mm | 1.05 mm | 1.05 mm |
| Product yield | High | Higher | lower | higher |

It can be known from the above table that compared to current COG technology and COF technology, although the present disclosure does not reduce a thickness of the display panel, a lower frame size of the display panel is significantly reduced; compared to COF side bonding, although the present disclosure does not reduce a lower frame size of the display panel, a thickness of the display panel is significantly reduced and product yield is also higher.

Therefore, the present disclosure has significant advantages of improving a screen ratio of display panels because a thickness of a lower frame area can be compressed to within 1.05 mm. It has no negative influences on the thickness of the whole display panel and solve the problem of increased thickness caused by COF side bonding for achieving narrow frames. The process used is similar to the process used in current structures, the yield is stable, and it is easy to promote mass production.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A display panel, comprising an array substrate, a color filter substrate disposed opposite to the array substrate, wherein terminal surfaces of the array substrate and the color filter substrate are flush with each other to form a side bonding area, one side of a conductive film is attached to the side bonding area, and the conductive film is in parallel to the side bonding area;
   an edge of the side bonding area corresponding to the color filter substrate or the array substrate forms a chamfer, and the conductive film extends to one end where the chamfer is disposed; and
   wherein another side of the conductive film is bonded to a chip on film bent along the chamfer for bonding to one surface of the array substrate away from the color filter substrate or one surface of the color filter substrate away from the array substrate.

2. The display panel according to claim 1, wherein the chamfer is disposed on the edge of the side bonding area corresponding to the array substrate, and the chip on film is bent along the chamfer and bonded to the surface of the array substrate away from the color filter substrate.

3. The display panel according to claim 1, wherein the chamfer is disposed on the edge of the side bonding area corresponding to the color filter substrate, and the chip on film is bent along the chamfer and bonded to the surface of the color filter substrate away from the array substrate.

4. The display panel according to claim 1, wherein the chip on film is bonded to the conductive film by an anisotropic conductive adhesive comprising an anisotropic conductive film (ACF), an anisotropic conductive adhesive (ACA), or an anisotropic conductive paste (ACP).

5. The display panel according to claim 1, wherein a protective layer is disposed on a surface of the bonded chip on film.

6. The display panel according to claim 1, wherein a protective layer with conductivity is disposed on a surface of the chamfer, and a terminal of the protective layer adjacent to the conductive film is connected to the conductive film.

7. The display panel according to claim 1, wherein the chamfer comprises a first chamfer disposed on the edge of the side bonding area corresponding to the array substrate and a second chamfer on the edge of the side bonding area corresponding to the color filter substrate; the first chamfer is smoothly connected to the second chamfer to form an arc of radius R.

8. The display panel according to claim 1, wherein impedance between the display panel and a driver chip on the chip on film is less than 10Ω.

9. A manufacturing method of a display panel, comprising:
- S1: providing an array substrate and a color filter substrate, wherein cutting lines of the array substrate and the color filter substrate are flush with each other to form a side bonding area;
- S2: manufacturing a chamfer on an edge of the side bonding area corresponding to the color filter substrate or the array substrate;
- S3: attaching one side of a conductive film to the side bonding area and making the conductive film extend to one end where the chamfer is disposed, wherein the conductive film is in parallel to the side bonding area; and
- S4: bonding a chip on film on another side of the conductive film and making the chip on film bent along the chamfer for bonding to one surface of the array substrate away from the color filter substrate or one surface of the color filter substrate away from the array substrate.

10. The manufacturing method according to claim 9, wherein the cutting lines are away from a wiring area of a lower frame of the display panel, and a gap formed by cutting along the cutting lines is filled with frame glue.

11. The manufacturing method according to claim 9, wherein the conductive film is prepared by magnetron sputtering, 3D printing, evaporation, or deposition.

12. The manufacturing method according to claim 9, wherein the chamfer is made by polishing and chamfering, and a surface roughness of the chamfer is less than 1 μm.

13. A display device, comprising the display panel according to claim 1.

14. The display device according to claim 13, further comprising an upper polarizer and a lower polarizer, wherein at least one of the upper polarizer or the lower polarizer is disposed on a same side as a driver chip bonded to the chip on film, and a thickness of the upper polarizer or the lower polarizer disposed on the same side is greater than a thickness of the driver chip.

15. The display device according to claim 13, further comprising an upper polarizer and a lower polarizer, wherein thicknesses of the upper polarizer and the lower polarizer are greater than a thickness of a driver chip.

16. The display device according to claim 13, further comprising a middle frame, wherein a driver chip bonded to the chip on film is disposed in the middle frame.

* * * * *